Patented Aug. 16, 1938

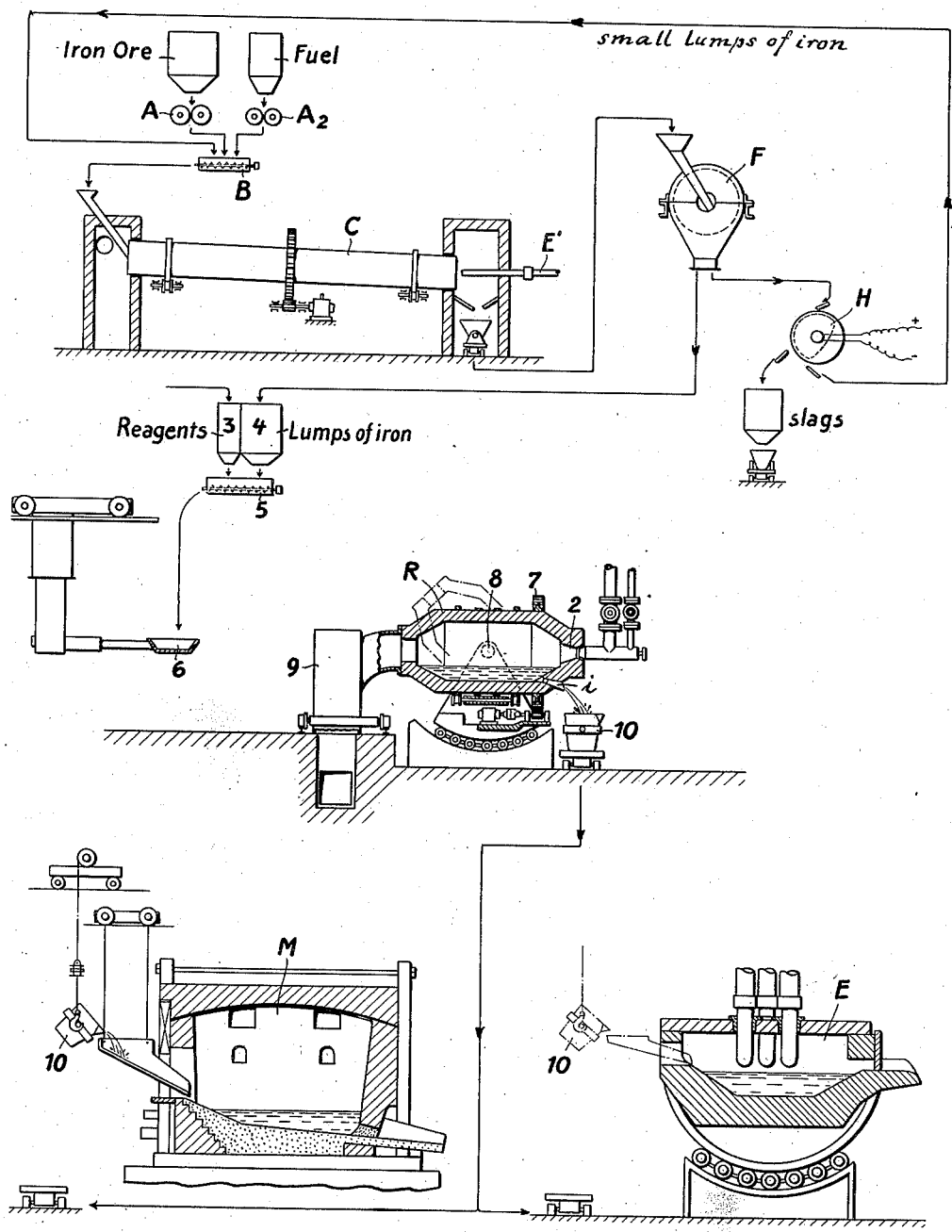

2,127,299

UNITED STATES PATENT OFFICE 2,127,299

TREATING LUMPED IRON

Friedrich Johannsen and Werner Völkel, Magdeburg, Germany, assignors to Fried. Krupp Grusonwerk, Aktien-Gesellschaft, Magdeburg/Buckau, Germany Application October 14, 1937, Serial No. 169,034
In Germany October 20, 1936

1 Claim. (Cl. 75—39)

Our invention relates in its broad aspects to improvements in the production of steel from iron available in the form of lumps and granules, and more especially from wrought iron as produced in more recent times in Germany and various other countries directly from ferriferous ores by a lumping process described in United States Patent 1,964,917.

As the result of the specific reactions occurring during said lumping process at lower temperatures than those existing in blast furnaces lumped wrought iron thus produced is richer in sulphur and contains in addition thereto other undesirable constituents including arsenic and phosphorus in relatively large proportions, much larger than in pig iron produced in blast furnaces.

While pig iron because of containing sulphur only from about 0.035 to 0.06 per cent, can be directly converted into steel in electrothermal or gas fired Siemens-Martin furnaces, wherein its sulphur content is appropriately reduced by reagents such as limestone, sodium carbonate etc. added to the molten charge, it is impossible to convert in the same way and under conditions of economy lumped wrought iron into steel because of its higher content of impurities, namely containing of sulphur alone 0.5 to 0.6 percent, that is about ten times more than in pig iron.

To wit: The inventors extensive experimental work has shown, that even by adding relatively large quantities of reagents to a molten charge of iron having an unusually high content of sulphur and other impurities specified above and undesirable in the production of steel, and although the purifying treatment was carried out in the indifferent atmosphere of an electrothermal furnace producing white slags poor in FeO content, and although means were provided for electro-magnetically stirring up the charge under treatment, an utterly small proportion of the undesirable constituents, not exceeding 0.16 percent, was removed; therefore the slags formed on the molten charge had to be removed and the purifying treatment repeated two or three times.

Because of the abnormally high operating expenses entailed by the long time consuming purifying treatment of the charge, preparatory to its conversion into steel the production of steel from iron having a high content of impurities as specified proved to be unprofitable and not feasible under conditions of economy in electro-thermal furnaces.

The same is true when working with open hearth furnaces of the Siemens-Martin type and heated by producer gas.

The purifying action of the lime added to the molten charge proved to be still smaller, presumably because of the presence of FeO produced in the oxidizing atmosphere of the furnace, which greatly impedes the desulphurization inasmuch as the calcium sulfide produced is re-decomposed by the FeO and the ferrous sulfide produced in turn will go back into and re-combine with the molten charge of iron.

It should be recalled at this juncture, that the problem of making steel from iron available in the form of lumps and granules having a large content of undesirable constituents has been formerly kept in view by the inventor of the improved lumping process described in his United States patent specification 1,964,917, wherein on page 3, lines 90-105 it is suggested to add appropriate reagents to the charge of ferriferous minerals, namely before the latter are heated and subjected to the lumping process in a rotary furnace.

However extensive experiments carried out according to this suggestion and with the object of ridding the lumped iron produced from the impurities concerned, or reducing its content of sulphur and other undesirable constituents failed, presumably because the purifying reagents completely disappear amongst the gangues and other slag forming constituents present in the charge in such large proportions, that the reagents are eaten up and digested by the slags produced long before they can react in virgin condition with the lumping iron.

Although limestone was used as reagent and available at low cost by adding larger proportions of same to the charge the production of lumped iron according to the modified lumping process under consideration proved to be unprofitable because of the higher consumption of fuel.

The primary object of this invention is to overcome the drawbacks outlined above by providing an improved purifying treatment, by which a very comprehensive removal of the sulphur, arsenic, phosphorus and other undesirable constituents contained in unusually large proportions in iron and iron alloys available in the form of lumps and granules can be readily effected under conditions of economy.

The nature and scope of this invention are briefly outlined in the appended claim and will be more fully understood from the following specification taken together with the accompanying drawing, in which a whole plant designed for producing from ferriferous ores lumped iron, purifying the latter according to this invention and converting it into steel is diagrammatically shown by way of an example.

The purifying treatment to which the material is subjected for the purposes of this invention includes mixing the charge with a finely subdivided purifying agent and smelting the mixture in a metallurgical furnace.

Experiment No. 1

Good results have been obtained with wrought iron produced by the Krupp lumping process described in United States Patent 1,964,917 and containing about 0.6 percent sulphur; on mixing the charge in cold condition with 5% calcium carbide and melting down the mixture in an electrothermal furnace slags were formed containing 8% sulphur, while the finished melt contained only 0.035 percent sulphur.

Experiment No. 2

The advantages of the improved purifying treatment became more evident from a comparative experiment, in which an equal quantity of lumped wrought iron of the same origin as before was directly melted, whereafter 5% calcium carbide were stirred into the molten charge: The sulphur content of the finished melt amounted in this case to 0.44 percent as against 0.035 percent after the treatment referred to above; the sulphur content of the slags obtained in the first experiment was two hundred times higher than that in the second case.

The inventors attribute the great efficiency of the purifying treatment referred to above to the relatively long and intimate contact into which the charge of iron on melting and slowly flowing down to the bottom of the hearth of the furnace comes with the layer of finely distributed reagent, which is then in condition of great activity and eager to absorb and combine with the impurities of the iron.

Various changes and modifications may be conveniently made in carrying out in practice the improved purifying treatment described and in the structural details of metallurgical furnaces used in connection with the said purifying and subsequent treatments as in the production of steel.

For instance the operations of mixing the charge and melting the mixture may be combined and carried out to advantage in a rotary reverberatory furnace shown in the drawing at R and heated by producer gas or powdered solid fuel blown thereinto by preheated air through intake 2.

The reagents in finely comminuted condition and the lumped iron are stored in bunkers 3, 4 and are taken therefrom in proper portions for being fed by a screw conveyer 5 and charging hopper 6 into the furnace R, which is capable of being slowly revolved by a toothed gearing 7 and of being tilted as indicated by dotted lines about pinion 8 for the removal of the slags produced; the latter are discharged through the intake port 2 of the furnace, while the gaseous products of combustion are drawn off through a moveable mouth piece 9 through a plug hole i the purified melt flows into the ladle 10, by which the latter is recharged for further treatment into a gas fired Siemens-Martin furnace M, an electrothermal furnace E or any other convenient type of furnace.

The plant seen in the upper section of the drawing diagrammatically shows the producing of lumped wrought iron from ferriferous ores by the process known from United States Patent 1,964,917 and comprises:

(1) Crushing rollers A, A2 by which the ferriferous ores and the fuel are comminuted;

(2) A rotary tubular furnace C, wherein the charge is heated and eventually the lumping of the iron is accomplished by the reaction with a current of oxidizing gases introduced through a pipe E';

(3) A crushing mill F, from which the comminuted slags jointly with the smaller lumps of iron are continuously discharged and subjected to an electromagnetic separating treatment indicated at H, while the larger lumps of iron are discharged at intervals and collected in the bunker 4. The smaller lumps of iron are returned into the conveyer B.

The advantages accruing from the employment of a rotary reverberatory furnace consist in that no separate mixing device is required and that the melting period is considerably reduced inasmuch as the lining of the furnace on revolving continuously transmits fresh heat to the charge.

When using a rotary reverberatory furnace as suggested and heating it by a flame carrying with it an excess of air, reducing agents, such as crushed coke or charcoal, should be added to the charge in order to prevent the production of FeO likely to impede the purifying action as explained above, and for facilitating the carbonization of the molten iron. Lime, manganese, sodium carbonate and calcium carbide were the preferred purifying agents for the purposes of this invention and selected consistently with the nature and quantities of the respective impurities contained in the iron or iron alloys under treatment.

The inventors in the course of their practical experiments found it advantageous to work with reagents producing a slag rich in lime and manganese, say containing about 30 percent Mn. To wit:

From slags so rich in manganese the latter can be reclaimed at low cost by known methods in the form of ferro-manganese and the reclaimed product can be re-used jointly with lime as purifying agent; in this way a closed cycle of purifying and reclaiming operations established according to this invention with the result, that the net quantity of manganese required for removing the impurities concerned is greatly reduced and that in consequence the purifying treatment is rendered more economical.

Moreover on using ferro-manganese as reagent and by appropriately controlling the purifying process described including the temperature of the molten charge, the oxidizing intensity of the heating flame and kindred factors a predetermined Mn content may be obtained in the molten charge ranging say from 0.4 to 12 percent as specified for subsequent refining and alloying operations.

Comparative experiments were made with lumped iron containing 0.6 percent sulphur and subdivided into two classes as to the size of the granules.

On analyzing the molten mass purified according to this invention and obtained from granules which were from 5 to 8 mm. in diameter it was found, that the remaining sulphur content was 0.06 percent, while in the case where smaller granules averaging 1 to 3 mm. in diameter were desulphurized the sulphur content after the treatment was only 0.02 percent.

Instead of mixing the lumps of iron with purifying reagents and fuel and melting down the mixture in a reverberatory furnace as proposed the purifying treatment may be carried out to advantage by briquetting the mixture with quicklime as binding and purifying agent and charging it into a liquid iron melt, more especially in cases, where the lumped iron consists of very small granules.

What we claim is:

Method of removing sulphur, arsenic, phosphorus and other undesirable constituents from iron and iron alloys available in the form of small lumps, which comprises mixing the material with finely subdivided lime and manganese in such proportions, that on melting the mixture slags rich in manganese are produced, reclaiming from said slags ferro-manganese and re-using the latter in a closed cycle of purifying and reclaiming operations.

FRIEDRICH JOHANNSEN.
WERNER VÖLKEL.